Oct. 8, 1957  W. A. ERNST ET AL  2,808,630
MATCHPLATE FOR THE PRODUCTION OF SHELL
MOLDS AND PROCESS OF MAKING THE SAME
Filed April 29, 1954

WITNESSES

INVENTORS
Wentworth A. Ernst, James A. Karnavas
and Ronald E. Bish
BY
ATTORNEY

United States Patent Office 2,808,630
Patented Oct. 8, 1957

2,808,630

MATCHPLATE FOR THE PRODUCTION OF SHELL MOLDS AND PROCESS OF MAKING THE SAME

Wentworth A. Ernst and James A. Karnavas, Pittsburgh, and Ronald E. Bish, Swissvale, Pa., assignors to Westinghouse Electric Corporation, East Pittsburgh, Pa., a corporation of Pennsylvania Application April 29, 1954, Serial No. 426,570

2 Claims. (Cl. 22—157)

This invention relates to a metallic filled thermosettable molding putty and casting processes using the same.

An object of this invention is to provide a novel molding putty comprising as its essential ingredients a critical ratio of a thermosettable resinous binder, a powdered metal filler and an amine-bentonite reaction product.

A further object of this invention is to provide a method of molding an article of manufacture which will possess high physical strength retention properties when exposed to temperatures up to 500° F. and higher, from a novel molding putty comprising as its essential ingredients a critical ratio of a thermosettable resinous binder, a powdered metal filler and an amine-bentonite reaction product.

A still further object of this invention is to provide a method for making matchplates suitable for use in the production of shell molds having sprue, runner, gate, and riser blanks thereon composed of a novel molding putty comprising as its essential ingredients a critical ratio of a thermosettable resinous binder, a powdered metal filler and an amine-bentonite reaction product.

Other objects of the invention will, in part, be obvious and will, in part, appear hereinafter.

For a more complete understanding of the invention, reference is made to the following description taken in conjunction with the accompanying drawing, in which.

Figure 1:
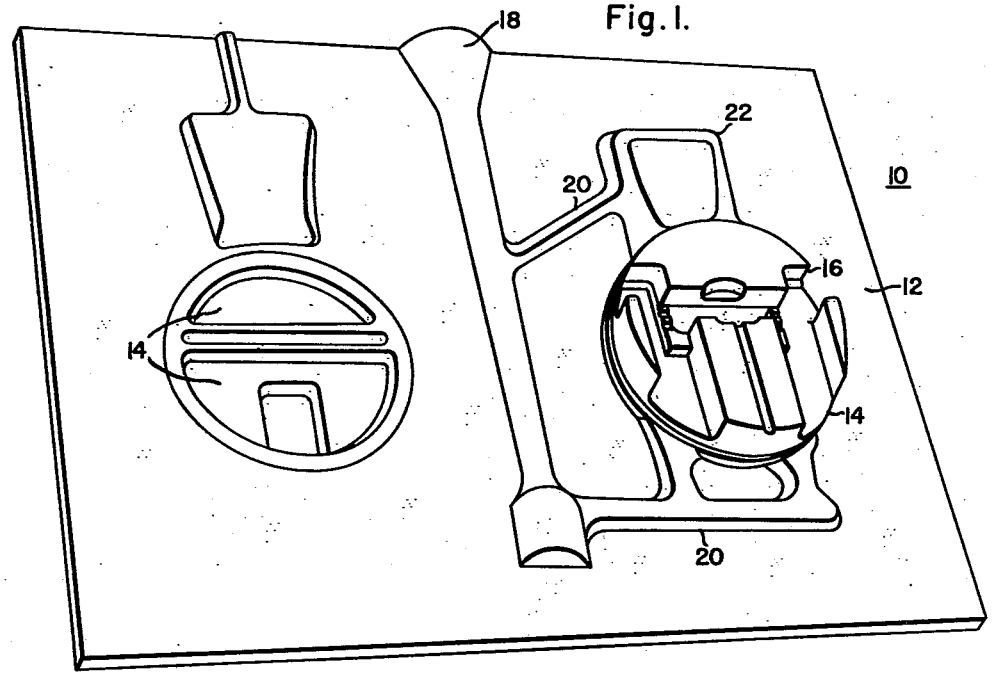
Figure 1 is a perspective view of a complete matchplate.

We have discovered a thermosettable molding putty filled with powdered metal which can serve as a mold for the casting of plastics, low melting alloys and as a die for the forming of investment mixtures such as sand phenolic resins utilized in shell molding processes. This putty can be formed by hand or under moderate pressure and can be cured with minimum dimensional changes.

The putty of this invention is particularly suitable in forming components for sprues, runners, gates and risers attached to a matchplate pattern. The matchplate pattern is used in the shell molding process for metal casting. In shell molding the metal is cast in a cavity formed by two single shells comprising a mixture of sand and thermosetting resin. The shells are made by pouring the sand-resin mixture over a heated matchplate pattern, and allowing the thin layer of sand-resin mixture adjacent to the hot matchplate to heat up and the resin therein flows and then hardens thereby forming a thin shell which may be further cured to a finished mold. The matchplate contains a replica of the piece to be cast and the necessary sprues, runners, gates and risers feeding thereto. Thus, when the cured shell is removed from the matchplate, it forms half of a complete molding cavity. Two such shells are clamped together to form a complete mold.

In designing a new shell mold, a number of different combinations of sprues, runners, gates and risers must be tried before a satisfactory feeding system is found. In past practice these sprue, runner, gate and riser components were machined out of brass stock and filed to fit. The tooling costs for such an operation frequently assumed disproportionately large percentages of the project cost.

With the discovery of the molding putty of this invention, components of the sprues, runners, gates and risers may be easily shaped by hand, and then cured in an oven. It is to be understood, of course, that the replica of the article to be molded may be also be of the molding putty of this invention. The cured components and replica are readily machineable or sanded to precise shape, and may be drilled and tapped for mounting on the matchplate base. Various complex forms have been shaped by hand from the putty compositions of this invention and oven cured at temperatures of 220° F. to 500° F. and higher without any appreciable change in configuration and having an average curing shrinkage of 0.8%. The pre-shaped components and replicas of the molding putty were placed on flat plates, being otherwise unsupported in the oven, and cured without any visible surface faults such as cracking or blistering.

If additional surface hardness is desired for the cured components and replicas, a suitable metal may be electrodeposited thereon because the blanks have good electrical conductivity due to the high metal content therein.

The molding putty of this invention comprises as its essential ingredients from 4% to 35% by weight of a thermosettable resin binder, from 60% to 95% by weight of a powdered metal filler and from 1% to 10% by weight of an amine-bentonite reaction product.

This molding putty is shaped to a desired configuration and size and cured by baking at temperatures of up to 650° F. It is also possible to cure the putty of this invention at room temperature by utilizing a suitable catalyst such as t-butyl hydroperoxide and an organometallic dryer use in the paint industry, for example, cobalt napthenate. The time of cure will, of course, depend on the type of resin used, catalyst, and also the physical characteristics of the molding such as size and thickness.

The powdered metal may be soft iron, copper, aluminum, magnesium, nickel, or alloys thereof and should be of a size to pass through a sieve of from 40 to 325 meshes or more per lineal inch. The resinous binder used in the formulation of the molding putty of this invention may be any thermosetting resin such as an epoxy or glycidyl polyethers, polyester, triallyl cyanurate, or triallyl cyanurate copolymerized with a suitable polyester resin.

The epoxy or glycidyl polyether resins employed are, in most cases, basically either condensation products of bisphenol-A and epichlorohydrin or of glycerol and epichlorohydrin, both types being catalyzed by amines or amino-derivatives, to form cross linked resins. Examples of the preparation of these epoxy resins may be found in Patent No. 2,538,072 and the patents cited therein.

Examples of the preparation of suitable polyesters and their combination with triallyl cyanurate may be found in Patent No. 2,510,503.

The amine-bentonite base reaction products employed in this invention are composed of a montmorillonite mineral in which at least a part of the cation content of the mineral has been replaced by a cation of an organic base. Clays that contain as a primary constituent a mineral of the group known as montmorillonites are generally referred to as bentonites. Bentonites in their raw state are hydrophilic but upon reacting with organic bases or their salts become organophilic products.

More specifically, a bentonite clay of the character described and exhibiting substantial base-exchange capacity is reacted with an organic compound, more particularly one generally known as an onium compound, by substituting for the clay cation the cation of the organic compound. The reaction product may be prepared not only from a base-salt reacted with a clay-salt, but from a free base reacted with an acid clay.

Examples of organic base compounds and their salts usable in the practice of the invention are salts of aliphatic, cyclic, aromatic, and heterocyclic amines; primary, secondary, and tertiary amines and polyamines; also quaternary ammonium compounds, as well as other monovalent or polyvalent onium compounds.

In preparing the amine-bentonite reaction products, aliphatic amine salts having from 12 to 20 carbon atoms, for example, hexadecyl amine salts and octadecyl amine salts, yield excellent results. The ratio of the amine compound to bentonite may be varied within certain limits in converting the bentonite to the organophilic condition. In general, however, it is desired to react the amine salt with the bentonite in the approximate ratio of 100 milliequivalents of amine salt to 100 grams of bentonite. Reaction products produced within this ratio give the maximum swelling as tested in nitrobenzene.

It is to be understood that when reference is made to basic organic onium compounds such as amines, it is implied that before reacting with the clay by base-exchange, the amine is converted to the onium form either by the addition of acid or by reason of the fact that some part of the inorganic base in the naturally occurring clay consists of hydrogen.

An example of the preparation of a suitable amine-bentonite reaction product is as follows:

*Example A*

One thousand grams of a Wyoming bentonite is dispersed in 25.45 liters of water, and the slurry formed is allowed to stand for two hours to settle out the non-clay impurities. In a separate vessel, 54.37 grams of glacial acetic acid is added to 240 grams of octadecyl amine, and the resulting amine salt is then dissolved in 1.45 liters of warm water. Upon addition of the amine salt solution to the dispersed bentonite, flocculation occurs and the precipitate, after being filtered, washed, dried and pulverized, constitutes the bentonite-organic base reaction product.

Other examples of suitable onium compounds and processes indicating how a bentonite-organic base reaction product may be prepared are found in the patent to Jordan 2,531,440, issued November 28, 1950, and the patent to Hauser 2,531,427, issued November 28, 1950. One or more of the amine-bentonite reaction products may be employed.

The following examples are illustrative of the formulation of the molding putties of this invention:

*Example I*

A molding putty having the following formulation was prepared:

| | Parts by weight |
|---|---|
| Epoxy resin | 18.8 |
| Diethylene triamine | 1.2 |
| Powdered copper (250 mesh) | 80 |
| Amine-bentonite of Example A | 5 |

A suitable epoxy resin for use herein is the Resin A in Patent No. 2,500,600 catalyzed with 6.5% by weight of diethylene triamine.

A sprue component of this composition was formed to shape and produced a hard shell pattern after curing at temperatures up to 450° F.

*Example II*

A molding putty having the following formulation was prepared:

| | Parts by weight |
|---|---|
| A mixture of 90% maleic anhydride-ethylene glycol polyester and 10% triallyl cyanurate | 25 |
| t-Butyl hydroperoxide | 0.6 |
| Amine-bentonite | 10 |
| Powdered aluminum (300 mesh) | 64.4 |

A sprue component made from this composition was used to make shell patterns after being baked at temperatures of up to 550° F.

*Example III*

A molding putty having the following formulation was prepared:

| | Parts by weight |
|---|---|
| Maleic anhydride-ethylene glycol polyester | 18 |
| t-Butyl hydroperoxide | 1 |
| Amine-bentonite | 6 |
| Powdered aluminum | 75 |

A sprue component made of this composition was used to make shell patterns after baking at temperatures up to 450° F.

In Figure 1 of the drawing, there is illustrated a complete matchplate 10 comprising a metal matchplate pattern 12, having components for a metal feeding system mounted thereon. The pattern 12 has cavities 14 therein, conforming to the shape of one-half of a member which is to be molded. A replica 16 of the other half of the member to be molded is mounted on pattern 12.

The components for the metal feeding system, which are mounted on pattern 12, include a sprue 18, gates 20 and a riser 22. These components are molded by hand into the shapes illustrated and comprise the molding putty composition of this invention. These components are cured while in contact with pattern 12 by heating to a temperature of from 70° to 600° F.

Figure 2:
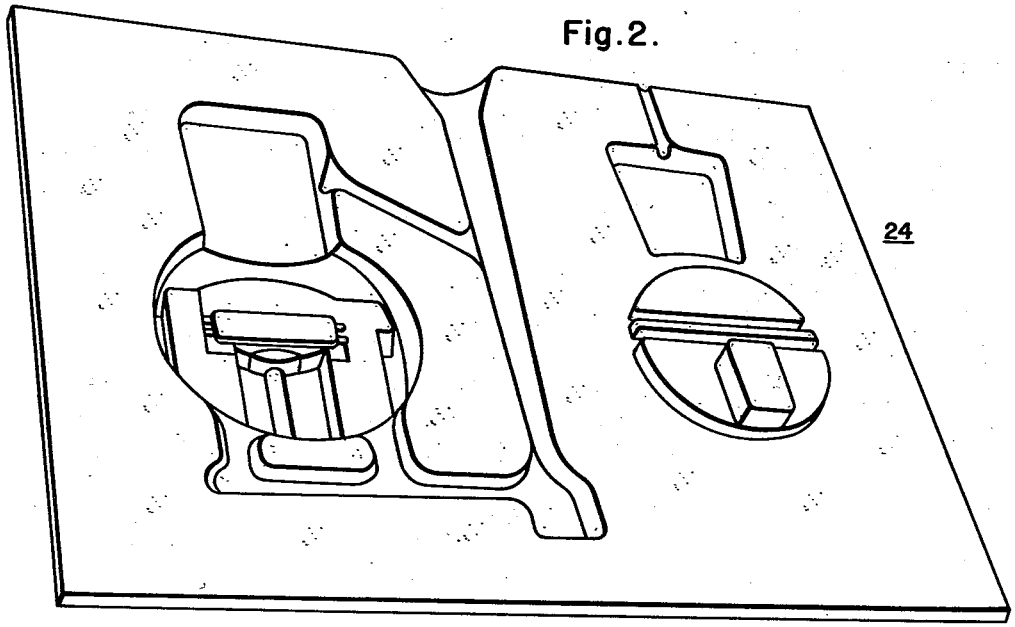
Fig. 2 is a perspective view of a shell mold made from the matchplate of Figure 1.

In Fig. 2, a shell mold 24 is illustrated which is made by pouring a mixture of sand and thermosetting resin over the heated matchplate 10. When cured, shell 24 is removed from matchplate 10 and comprises one-half of a complete mold cavity. Two such shells are clamped together to form a complete mold.

It is intended that all matter contained in the above specification shall be interpreted as illustrative and not in a limiting sense.

We claim as our invention:

1. In the method of making a complete matchplate for the production of shell molds, said matchplate comprising (1) a matchplate pattern and (2) components for a metal feeding system, the components for said metal feeding system being formed to a desired size and configuration from a molding putty, the molding putty comprising as its essential ingredients from 4% to 35% by weight of at least one heat hardenable thermosettable resinous binder selected from the group consisting of epoxy resins, polyester resins, triallyl cyanurate resins, and copolymerized triallyl cyanurate-polyester resins, from 60% to 95% by weight of a powdered metal filler selected from at least one of the group consisting of iron, copper, aluminum, magnesium and nickel and from 1% to 10% by weight of an amine-bentonite, mounting the formed molding putty components in a predetermined position on said matchplate pattern, and curing the formed molding putty components while they are in contact with said pattern by heating to a temperature of from 70° to 600° F. whereby a complete matchplate is formed.

2. A complete matchplate for the production of shell molds, said matchplate comprising (1) a matchplate pattern and (2) components for a metal feeding system, the components for said metal feeding system being formed to a desired size and configuration and comprising a heat hardened molding putty comprising as its essential ingredients from 4% to 35% by weight of at least one heat hardenable thermosettable resinous binder selected from the group consisting of epoxy resins, polyester resins, triallyl cyanurate resins, and copolymerized triallyl cyanurate-polyester resins, from 60% to 95% by weight of a powdered metal filler selected from at least one of the group consisting of iron, copper, aluminum, magnesium and nickel and from 1% to 10% by weight of an amine-bentonite.

References Cited in the file of this patent

UNITED STATES PATENTS

| | | |
|---|---|---|
| 230,979 | Woolnough | Aug. 10, 1880 |
| 902,062 | Estep | Oct. 27, 1908 |
| 928,714 | Thompson | July 20, 1909 |
| 1,335,509 | Kralund | Mar. 30, 1920 |
| 1,418,703 | Evans | June 6, 1922 |
| 2,056,415 | Young | Oct. 6, 1936 |
| 2,419,847 | Mittermaier | Apr. 29, 1947 |
| 2,531,396 | Carter et al. | Nov. 28, 1950 |